United States Patent Office 3,759,715
Patented Sept. 18, 1973

3,759,715
PROCESS OF MAKING A TEXTURED, EXPANDED FOOD PRODUCT
Stephanus F. Loepiktie, St. Louis, and Ronald Jacob Flier, Glendale, Mo., assignors to Ralston Purina Company, St. Louis, Mo.
No Drawing. Filed Feb. 8, 1971, Ser. No. 113,634
Int. Cl. A23j 3/00
U.S. Cl. 99—17                                          18 Claims

ABSTRACT OF THE DISCLOSURE

An expanded protein food product having the resiliency, chewiness and mouthfeel characteristics of real meat and further characterized by excellent rehydration characteristics is produced from a vegetable protein source material by forming a dough thereof, confining a major surfacial portion of the dough, and subjecting the dough to an elevated temperature and pressure in the order of 80–120 p.s.i. followed by pressure release, to controllably expand the dough along the axis of the unconfined surfacial portions and produce a food product having textural characteristics very similar to real meat.

BACKGROUND OF THE INVENTION

This invention relates to a method of forming a protein food product, especially a meat simulating food product from protein containing vegetable materials, such as soybeans or other oleaginous vegetable materials.

In U.S. Pat. 3,496,858 is disclosed a method of preparing an expanded protein food product resembling meat by extrusion of defatted proteinaceous material through a zone of high pressure and temperature to cause conversion of the protein material to a flowable substance which is forced through restricted orifice means into an environment of lower temperature and pressure to cause the protein material to expand and produce a structure resembling meat. This method while considered to be a real innovation in the commercial production of a meat-like product from vegetable protein nevertheless requires expensive equipment and processing conditions which may not always be the most desirable depending on the type of product to be produced.

Another type of food product produced from protein is generally described in U.S. Pat. 3,142,571 in which a dough of defatted oil seed protein is formed with a moisture content of 30–40% and placed in a pan or container to expose the largest amount of surface area available then placed in a steam chamber and subjected to a pressure below 50 p.s.i. for a period of time to cook the dough; at the end of a predetermined time the pressure is released rapidly to cause the dough to swell and produce a cellular structure. This process while utilizing very inexpensive and available equipment does not produce a meat-like or fibrous structure as described in U.S. Pat. 3,496,858, but rather produces more of a bread-like structure which lacks the fibrous structure of meat and consequently lacks certain rehydration characteristics which are highly desirable in and characteristic of a simulated meat-like product produced from vegetable protein materials.

SUMMARY OF THE INVENTION

We have determined that a meat-like structure can generally be obtained with the use of inexpensive equipment and by generally cooking of a dough of a secondary protein material such as vegetable protein or microbial protein, if the dough is controllably expanded substantially along the longitudinal axis of the dough. This may be preferably accomplished by rolling or shaping the dough into a cylindrical or rod-like shape, followed by confinement of the major surfacial portion of the dough, with the ends of the shaped dough or smaller surfacial portions of the dough being essentially unconfined. This permits expansion of the dough along the longitudinal axis or the axis of the unconfined surfacial portions of the dough. When such expansion occurs, then the protein product formed has a fibrous structure similar to that of meat and is characterized by excellent rehydration characteristics.

We have also determined that highly desirable structural characteristics may be obtained in combination with the process of controlling expansion by employing a tempering step with the dough of the protein material which is roughly analogous to the process of tempering metals, especially the process of tempering or hardening metals with mechanical energy or to the processes of hardening candy such as taffy by pulling. We have determined that if the dough is subjected to various mechanical working steps such as rolling, folding or stretching in combination with unidirectional or controlled expansion of the mixtures that an expanded food product is produced which remarkably resembles meat in structure and is produced with inexpensive and readily available equipment.

The product which is formed in accordance with the present invention may be characterized as an expanded, irreversible proteinaceous structure having excellent physical properties, including texture, moisture stability and tensile strength, which properties make it particularly suitable for various food uses. The product produced by the present invention has excellent tensile strength not only when wet but also when dry, and in addition retains these excellent physical properties even after being subjected to extreme heat and moisture conditions such as by cooking.

DESCRIPTION OF THE PREFERRED EMBODIMENTS

The present invention is best accomplished by mixing together secondary protein source materials such as a vegetable protein source material containing at least about 30% protein and an aqueous liquid to form a dough type material. Water alone is the preferred liquid, but mixtures of various other liquids with water could be employed. Also various vegetable protein materials, especially oleaginous materials, can be employed preferably in defatted condition, including isolated soy protein, soy flour, defatted soy flakes, cottonseed meals, sesame seed meals peanut meals, and the like. Although it is preferred that substantially unheated protein materials be employed, it is understood that partially toasted or partially hydrolyzed protein materials may also be employed where the degree of heating or hydrolysis is only such that the proteinaceous mixture still expands to form the product of the present invention. Whether a particular protein material will be suitable can readily be determined by trial according to the teachings herein to determine whether it will expand into a water-stable, textured food product Furthermore, any of the protein containing materials employed as starting materials in the invention should have water dispersible properties, such properties being especially useful in making the protein available to form the expanded structure of the invention. It has also been found that the product of the invention must contain at least about 30% by weight protein in order to obtain the desired physical properties such as the desired texture, degree of expansion, tensile strength, etc.

The expanded protein product of the present invention is able to maintain its integrity under cooking conditions of elevated temperature and pressure as is encountered in canning and retorting of canned food products. In contrast, bread products containing substantially less protein or protein products having the same amount of protein but possessing a bread-like structure cannot maintain their integrity under such conditions.

The most favorable results are obtained hereunder, when the aqueous liquid is added to the portion containing material to form the dough in an amount of from about 30 to 50% by weight of the dough, and preferably about 40 to 50% by weight of the dough. It is to be understood that other ingredients such as color, flavoring and the like may also be added to the mixture to obtain specific end products.

After mixing together the oleaginous seed material and the aqueous liquid to form the dough, it may be necessary to adjust the pH of said mixture to provide the necessary conditions for expanding the product. It has been found that the best results are obtained where the mixture has a final pH of from about 5 to about 10 and preferably from about 5.5 to about 9.5. Where the pH is below about 5, it has been found that the product gels and discolors to form a crumbly product and does not have desirable water absorption properties. Where the pH is above about 10, it has been found that the resulting product has poor color and undesirable, unappealing physical characteristics. Where it is necessary to adjust the pH to a value within the above described range, the pH may be adjusted by the use of suitable known, food grade chemical compositions such as sodium hydroxide, ammonium hydroxide, ammonium carbonate, ammonium bicarbonate, sodium carbonate, trisodium phosphate, sodium bicarbonate, potassium phosphate, potassium carbonate, potassium bicarbonate, and the like.

The aqueous protein mixture or dough so formed is preferably then subjected to a tempering operation to impart desired physical properties to the mixture and to the final product, although one may omit such a step and still obtain the expanded food product of the present invention. A variety of methods may be used to temper the protein mixture, depending on the particular configuration and properties desired in the final expanded product. The mixed material may be rolled, stretched, folded, or worked with mechanical beaters or even subjected to several combinations of tempering steps. The tempering operation improves the resilient, chewy, and meat-like properties of the material. I have found that a rolling step is particularly advantageous in imparting the desired meat-like characteristics in the final expanded product. The rolling operation imparts a degree of tempering which provides a meat-like expanded product which has the ability to absorb water and aqueous liquids, is tougher, more resilient and chewier, and which will maintain its structure and physical properties when subjected to heat.

The tempering operation and the texture of the final product are greatly influenced by the presence of various humectant and preservative solvent materials in the aqueous proteinaceous mix. Typical preservative organic solvent and humectant materials are glycerol, 1,2-propanediol, and mixtures thereof. By adding from 10% to 50% by weight of the aqueous liquid of organic solvent material to the aqueous liquid, tempering, and expanding the proteinaceous mix into an irreversible structure, a product is formed which will remain stable and resistant to bacterial and mycotic contamination and which will have a pleasing soft, plasticized texture after prolonged storage under room temperature conditions. Other reagents may also be added to the proteinaceous mix to influence the tempering operation or to impart other properties such as fiber toughness or rehydration characteristics which are important to the protein product. Sulfur, salt, sodium sulfite, sodium bicarbonate, calcium, carbonate, hydrogen peroxide, cysteine, sodium hypophosphite, or other food grade reagents may also be added to the proteinaceous mix to modify the properties of the protein product. Cysteine may be particularly useful because it supplements the amino acid content of the proteinaceous source.

The tempered dough is then subjected to controlled expansion and preferably, substantially, unidirectional expansion to form a fibrous meat-like structure in the product and causing the product to have the resilient chewy characteristics of natural meat. As previously noted, when a dough of a protein material is employed, the critical element insofar as obtaining a fibrous as opposed to a bread-like structure is to controllably expand the dough and preferably expand the dough substantially unidirectionally. This may be preferably accomplished by rolling or shaping the dough into a cylindrical or roll-like mass followed by confinement of the major surfacial portion of the dough with the minor surfacial portions or ends of the cylindrical mass of dough being unconfined although depending on the container other than a cylindrical shape may be employed. This permits expansion in the direction of the unconfined surfacial portion or along the axis of the unconfined surfacial portions of the dough which is normally also the longitudinal axis of the dough. Expansion along the axis of the unconfined surfacial portions of the dough imparts a stretching or even a compression effect to the protein material so that when the dough or protein material is heat set, a fibrous as opposed to a bread-like structure is obtained.

Unidirectional or controlled directional expansion of the partially confined dough may be accomplished in a variety of ways but may preferably and easily be carried out if the dough after tempering is rolled or shaped into an elongated or rod-like mass. This dough is then placed in an elongated container such as a pipe or tube or other container which may be rectangular as well as cylindrical, and which confines the major surfacial portion of the dough and with the ends or smaller surfacial portions of the dough being unconfined. This permits controlled or unidirectional expansion of the dough along the axis of these unconfined portions or in the direction of the unconfined portion and therefore, form an expanded food product resembling meat.

The pipe, tube, or restraining container may preferably be coated with "Teflon" or other inert material so as to prevent sticking of the dough to the container upon expansion. The particular type of container which may be employed to provide controlled and preferably unidirectional expansion is not critical to the practice of the present invention. It is preferable that the pipe or restraining container be about the same diameter or width as the dough although slightly larger so as to allow controlled expansion. It is also desirable that the pipe and the dough not be greater than about 1" in diameter or width since at the temperatures and pressures employed, some of the dough may remain uncooked if too large a piece of dough and container are employed.

The tempered roll or piece of dough in the container is then subjected to an elevated temperature and pressure sufficient to heat set the protein and form an irreversible heat stable structure of the protein material. Accordingly, when the pressure is released or reduced, moisture present in the dough will be released or volatilized and therefore, cause expansion of the dough along the axis of the unconfined surfacial portions or along the longitudinal axis of the dough. The water which is part of the protein aqueous liquid mixture or dough is believed to be rendered highly volatilizable by being exposed to the condition of high temperature and pressure and is therefore able to be quickly volatilized by a rapid pressure reduction causing the material to expand. However, because of the manner in which the dough is confined, controlled expansion results along the axis of the unconfined surfaces of the dough which is normally along the longitudinal axis of the dough so as to impart a fibrous structure to the product.

To achieve the elevated temperature and pressure conditions, the tempered protein aqueous liquid in the container is placed in a cooking vessel or other suitable container capable of withstanding high temperatures and pressures and subjected to high temperatures and pressures. The attaining of both a high temperature and pressure may be suitably accomplished with live steam in an apparatus as for example a steam chamber. Generally the temperature will in the cooking vessel or chamber thereof vary between about 300–500° F., with lower temperatures than these being insufficient to cause sufficient expansion and higher temperatures being conducive to burning or scorching of the protein material. The pressure within the chamber or cooking vessel in combination with the aforementioned temperature range will vary between 80–120 pounds per sq. in. with lower pressures than these failing to cause fiber formation but rather producing an undesirable bread-like structure with poor strength.

The time during which the tempered protein aqueous liquid mixture is subjected to the aforementioned temperature and pressure will vary depending on the specific combination of temperature and pressure which is employed, but most generally will vary between 1–5 minutes. As previously noted, subjection of the protein aqueous liquid mixture to the conditions of high temperatures and pressures is believed to render the moisture present in the mixture readily susceptible to volatilization upon exposure to lower pressure. Accordingly, as pressure is released in the cooking vessel or container, expansion or puffing of the mixture results by the escape of volatilized moisture. In addition, since the major surfacial portion of the elongated dough is confined, expansion takes place substantially along the axis of the unconfined surfaces of the dough to cause a stretching effect of the protein materials and to produce a fibrous structure as opposed to the bread-like structure one would obtain if random rather than unidirectional expansion or expansion in a single direction is employed. The pressure release time may accordingly vary from a few seconds to as much as twenty seconds, but preferably will be from about 10 to 20 seconds. This pressure release time in combination with the aforementioned conditions of temperature and pressure enhances controlled and unidirectional expansion, thus imparting a stretching effect to the material and producing a fibrous structure having the chewiness and resiliency of natural meat.

The following examples will generally serve to be illustrative of my invention.

Example 1

110 grams of solvent extracted soybean meal having a protein content of approximately 50% by weight was mixed with about 90 grams of water and 0.1 gram of sulfur in a Brabender Sigma blade food mixer for about five minutes to form a generally homogeneous dough. The dough was then separated into individual chunks of about 60 grams and rolled or formed into cylindrical rods of about ½ inch in diameter and about 4 inches in length. These were then placed in a "Teflon"-coated aluminum tube of about 1 inch in diameter and about 8 inches long with the ends of the tube being open. The tube containing the rod of dough was placed into a container to which pressurized steam could be added and an elevated temperature and pressure maintained for a predetermined period of time. Pressurized steam was added to the container with the tube therein until a pressure of 100 p.s.i. and a chamber temperature of 338–340° F. was attained in the container for a period of about two minutes. The pressure was rapidly released within the time of 15–20 seconds. The product removed from the aluminum tube was a cylindrical-shaped, puffed and expanded product with a tough resilient fiber structure. Expansion had occurred substantially unidirectionally along the longitudinal axis of the dough or along the axis of the unconfined surfaces of the dough or ends of the tube in an amount of about 4¾ inches. On the other hand, expansion had taken place in the opposite direction or in the direction of the confined surfacial portions of the dough of only about ½ inch or so. The product was sliced and the internal structure was observed to be cellular and the material had a chewy resistance with the resiliency and textural characteristics of meat.

Example 2

110 grams of solvent extracted soybean meal having a protein content of approximately 50% by weight was mixed with about 90 grams of water and 0.1 cc. of concentrated sulfuric acid in a Brabender Sigma blade food mixer for about five minutes to form a generally homogeneous dough. The dough was then separated into individual chunks and formed into a rectangular shape or slab of dough of about 3 inches in length, 3½ inches in width and ⅜ inches in thickness. This was then placed in a rectangular tray with dimensions of about 6 inches in length, 3½ inches in width and ½ inch thick. The two lengthwise ends were open. The slab of dough was placed therein and the tray containing the dough was placed into a container to which pressurized steam could be added and an elevated temperature and pressure maintained for a predetermined period of time. Pressurized steam was added to the container with the tray therein until a pressure of 100 p.s.i. and a chamber temperature of 330–340° F. was attained in the container for about one minute and 20 seconds. The pressure was then released over a period of time of 15–20 seconds. The product removed from the tray was a puffed and expanded slab with a tough resilient fibrous structure. Expansion had primarily occurred along the lengthwise axis of the rectangular tray, with expansion taking place in the opposite direction only very slightly. The product was sliced and had a chewy resistance similar to that of real meat.

Example 3

110 grams of solvent extracted soybean meal having a protein content of approximately 50% by weight was mixed with about 90 grams of water and 0.1 gram of sulfur in a Brabender Sigma blade food mixer for about 5 minutes to form a homogeneous dough. The dough was separated into individual chunks of about 60 grams and formed into cylindrical rods of about ½ inch in diameter and about 4 inches long. These rods were then rolled on a pair of canvas belts for about 15 seconds to aid in forming the rods as well as to impart the desired surface characteristics to the material and were then placed in a "Teflon"-coated aluminum tube of about one inch in diameter and about 8 inches long with the ends of the tube being open. The tube containing the rod of dough was placed into a container to which pressurized steam could be added and an elevated temperature and pressure maintained for a predetermined period of time. Pressurized steam was added to the container with the tube therein until a pressure of 100 p.s.i. and a temperature of 338–340° F. was attained in the container for a period of about two minutes. The pressure was rapidly released within the time of 15–20 seconds. The product removed from the aluminum tube was a cylindrical-shaped puffed and expanded product with a tough resilient fiber structure. Expansion had occurred substantially unidirectionally along the longitudinal axis of the dough or along the axis of the unconfined surfaces of the dough or ends of the tube in an amount of about 4¾ inches. On the other hand, expansion had taken place in the opposite direction or in the direction of the confined surfacial portions of the dough or only about ½ inch or so. The product was sliced and the internal structure was observed to be cellular and the material had a chewy resistance with the resiliency and textural characteristics of meat.

Example 4

The cylindrical-shaped rod of dough approximately ½ inch in diameter and about 4 inches long was formed and tempered as in Example 3 and was then placed in a "Teflon"-coated aluminum tube of about 1 inch in diameter and about 8 inches long with the ends of the tube being open. The tube containing the rod of dough was placed into a container to which pressurized steam could be added and an elevated temperature and pressure maintained for a predetermined period of time. Pressurized steam was added to the container with the tube therein until a pressure of 120 p.s.i. and a temperature of 340-350° F. was attained in the container for a period of two minutes. The pressure was rapidly released within the time of 15-20 seconds. The product removed from the aluminum tube was a cylindrical-shaped, puffed and expanded product with a tough resilient fiber structure. Expansion had taken place substantially unidirectionally along the longitudinal axis of the dough or along the axis of the unconfined portions of the dough or ends of the tube in an amount of about 5½ inches. On the other hand, expansion had taken place in the opposite direction or in the direction of the confined surfacial portions of the dough of only about ½ inch or so. The product was sliced and the internal structure was observed to be cellular and the material had a chewy resistance with the resiliency and textural characteristics of meat.

Example 5

The cylindrical-shaped rod of dough approximately ½ inch in diameter and about 4 inches long was formed and tempered as in Example 3 and was then placed in a "Teflon"-coated aluminum tube of about 1 inch in diameter and about 8 inches long with the ends of the tube being open. The tube containing the rod of dough was placed into a container to which pressurized steam could be added and an elevated temperature and pressure maintained for a predetermined period of time. Pressurized steam was added to the container with the tube therein until a pressure of 80 p.s.i. and a temperature of 320-325° F. was attained in the container for a period of three minutes. The pressure was rapidly released within the time of 15-20 seconds. The product removed from the aluminum tube was a cylindrical-shaped, puffed and expanded product with a tough resilient fiber structure. Expansion had taken place substantially unidirectionally along the longitudinal axis of the dough or along the axis of the unconfined portions of the dough or ends of the tube in an amount of about 3¼ inches. On the other hand, expansion had taken place in the opposite direction or in the direction of the confined surfacial portions of the dough of only about ½ inch or so. The product was sliced and the internal structure was observed to be cellular and the material had a chewy resistance with the resiliency and textural characteristics of meat.

Example 6

Five 110 gram portions of solvent extracted soybean meal having a protein content of approximately 50% by weight were each mixed with about 90 grams of water and 0.1 gram of sulfur in a Brabender Sigma blade food mixer for about five minutes each to form a generally homogeneous dough. In addition, each of the five portions of ough contained the following amounts by weight of 96% sulfuric acid:

|  | Cc. H$_2$SO$_4$ (96%) by weight |
|---|---|
| Dough # 1 | 0.1 |
| Dough # 2 | 0.2 |
| Dough # 3 | 0.3 |
| Dough # 4 | 0.4 |
| Dough # 5 | 0.5 |

Each portion of dough was then separated into individual chunks of about 60 grams which was then rolled or formed into cylindrical rods of about ½ inch in diameter and about 4 inches in length. The formed rods were then each placed in a "Teflon"-coated aluminum tube of about one inch in diameter and about 8 inches long with the ends of the tube being open. Each tube containing the rod of dough was then placed in a container to which pressurized steam could be added and an elevated temperature and pressure maintained for a predetermined period of time. Pressurized steam was then added to the container with the tubes therein until a pressure of 100 p.s.i. and temperature of 338-340° F. was attained in the container for a period of about two minutes. The pressure on the container was rapidly released to atmospheric pressure within 15-20 seconds. The product removed from each aluminum tube was a cylindrical-shaped, puffed and expanded product with a tough resilient fiber structure. Expansion had taken place substantially unidirectionally along the longitudinal axis of the dough or along the axis of the unconfined portions of the dough or ends of the tube in an amount of about five inches. On the other hand, expansion had taken place in the opposite direction or in the direction of the confined surfacial portions of the dough of only about ½ inch or so. The internal structure of the product was cellular and the material had a chewiness similar to meat. It was additionally observed that as the amount of added sulfuric acid was increased the toughness of the fibrous material correspondingly increased with the toughness being measured by the force in pounds which is required to shear a gram of dried fibrous material. In addition, the water absorption or rehydration characteristics of the fibrous materials were measured and generally the water absorption properties of the fibers decreased as the amount of sulfuric acid increased. Accordingly water absorption and shear characteristics on the five individual portions of dough were as follows:

|  | Average water absorption, g. H$_2$O/g. dry fiber | Average shear, lb./g. dry fiber |
|---|---|---|
| Dough number: | | |
| 1 | 1.40 | 23.06 |
| 2 | 1.08 | 26.69 |
| 3 | 0.88 | 28.80 |
| 4 | 1.01 | 30.81 |
| 5 | 0.99 | 26.90 |

Example 7

110 grams of solvent extracted soybean meal having a protein content of approximately 50% by weight was mixed with about 60 grams of water and 30 grams of glycerine in a Brabender Sigma blade food mixer for about five minutes to form a generally homogeneous dough. The dough was then separated into two individual chunks of about 60 grams each and rolled or formed into cylindrical rods of about ½ inch in diameter and about 4 inches in length. These rods were then rolled by hand for about 10-15 seconds and were then placed in a "Teflon"-coated aluminum tube of about one inch in diameter and about 8 inches long with the ends of the tube being open. The tube containing the rod of dough was then placed into a container to which pressurized steam could be added and an elevated temperature and pressure maintained for a predetermined period of time. Pressurized steam was then added to the container with the tube therein until a pressure of 100 p.s.i. and a temperature of 338-340° F. was obtained in the container for a period of about two minutes. The pressure was rapidly released within the time of about 5-10 seconds. The product removed from the aluminum tube was a cylindrical-shaped, puffed and expanded product with a tough fiber structure and yet was soft or resilient when compressed or touched. Expansion had occurred substantially unidirectionally along the longitudinal axis of the dough or along the axis of the unconfined surfaces of the dough or ends of the tube in an amount of about 2½ inches. On the other hand, expansion in the opposite direction or in the direction of the confined surfacial portions of the dough was only about ½ inch or so.

We claim:

1. A method of producing a textured, expanded food product from a secondary protein source material having a protein content of at least about 30% by weight protein comprising the discrete steps of sequentially; forming a dough of the protein source material and an aqueous liquid; confining the dough so that a major portion of the surface of the dough is confined and a smaller portion of the surface of the dough is unconfined; exposing the partially confined dough to a heated atmosphere at a pressure between about 80 and 120 p.s.i., the temperature and pressure being such that the textured expanded product is produced upon release of the pressure; and releasing the pressure to cause the partially confined dough to expand in the direction of the unconfined portion of the dough and form an expanded food product.

2. A method as set forth in claim 1, wherein the aqueous liquid is added to the dough in an amount such that the moisture content of the dough is between about 40% and 50% by weight of said dough.

3. A method as set forth in claim 1, wherein said protein source material is derived from soybeans.

4. A method as set forth in claim 1, wherein release of the pressure is carried out during a time interval of between about 10 and 20 seconds.

5. A method as set forth in claim 1, wherein the heated atmosphere is at a temperature of between about 300–350° F.

6. A method of producing a textured expanded food product having meat simulating textural characteristics from a vegetable protein source material having a protein content of at least about 30% by weight comprising the discrete steps of sequentially; forming a dough of the protein source material and an aqueous liquid, mechanically tempering the dough; confining the dough so that a major portion of the surface of the dough is confined and a smaller portion of the surface of the dough is unconfined; exposing the partially confined dough to a heated atmosphere at a pressure between about 80–120 p.s.i., the temperature and pressure being such that the textured expanded product is produced upon release of the pressure; and releasing the pressure to cause the partially confined dough to expand in the direction of the unconfined portion of the dough and form an expanded food product.

7. A method as set forth in claim 6, wherein the aqueous liquid is added to the dough in an amount such that the moisture content of the dough is between about 40% and 50% by weight of said dough.

8. A method as set forth in claim 6, wherein said protein source material is derived from soybeans.

9. A method as set forth in claim 6, wherein release of the pressure is carried out during a time interval of between about 10 and 20 seconds.

10. The method as set forth in claim 6, wherein the heated atmosphere is at a temperature of between about 300–350° F.

11. A method of producing a textured, expanded food product having meat simulating characteristics from a vegetable protein source material having a protein content of at least about 30% by weight comprising the discrete steps of sequentially; forming a dough of the protein source material and an aqueous liquid containing a humectant material selected from the group consisting of glycerol, 1,2-propanediol, and mixtures of glycerol and 1,2-propanediol, mechanically tempering the dough; confining the dough so that a major portion of the surface of the dough is confined and a smaller portion of the surface of the dough is unconfined; exposing the partially confined dough to a heated atmosphere at a pressure of between about 80–120 p.s.i., the temperature and pressure being such that the textured expanded product is produced upon release of the pressure; and releasing the pressure to cause the partially confined dough to expand in the direction of the unconfined portion of the dough and form an expanded food product.

12. The method as set forth in claim 11, wherein the aqueous liquid is added to the dough in an amount such that the moisture content of the dough is between about 40% and 50% by weight.

13. The method as set forth in claim 11, wherein said protein source material is derived from soybeans.

14. A method as set forth in claim 11, wherein release of the pressure is carried out during a time interval of between about 10 and 20 seconds.

15. A method as set forth in claim 11, wherein the heated atmosphere is at a temperature of between about 300–350° F.

16. A method as set forth in claim 11, wherein the humectant is added at a level between about 10% and 50% by weight of the dough.

17. A method of producing a textured, expanded food product having the resiliency, chewiness, and mouthfeel characteristics of meat from a vegetable protein source material of at least about 30% by weight protein comprising the discrete steps of sequentially; forming a dough of the protein source material and between about 40% and 50% by weight of an aqueous liquid; confining the dough so that a major portion of the surface of the dough is confined and a smaller portion of the surface of the dough is unconfined to allow expansion along the axis thereof; exposing the partially confined dough to a heated atmosphere at a pressure between about 80–120 p.s.i. to convert a portion of the aqueous liquid to steam, the temperature and pressure being such that the textured expanded product is produced upon release of the pressure; and releasing the pressure so as to controllably expand the partially confined dough along the axis of the unconfined portions and form an expanded food product having textural characteristics similar to that of meat.

18. A method of producing a textured, expanded food product having the resiliency, chewiness, and mouthfeel characteristics of meat from a vegetable protein source material of at least about 30% by weight protein comprising the discrete steps of sequentially; forming a dough of the protein source material and between about 40 to 50% by weight of an aqueous liquid; rolling the dough into a shape resembling a rope; confining the rolled dough so that a major portion of dough is confined and the ends of the rolled dough are unconfined; exposing the partially confined dough to a heated atmosphere at a pressure between about 80–120 p.s.i. to convert a portion of the aqueous liquid to steam, the pressure and temperature being such that the textured expanded product is produced upon release of the pressure; and releasing the pressure so as to controllably expand the partially confined dough along the axis of the unconfined portions and form an expanded food product having textural characteristics similar to that of meat.

References Cited

UNITED STATES PATENTS 3,645,747   2/1972   Palmer _____ 99—17
3,142,571   7/1964   McAnelly _____ 99—14

A. LOUIS MONACELL, Primary Examiner

W. A. SIMONS, Assistant Examiner

U.S. Cl. X.R.

426—802

UNITED STATES PATENT OFFICE
CERTIFICATE OF CORRECTION

Patent No. 3,759,715    Dated September 18, 1973

Inventor(s) Stephanus F. Loepiktie and Ronald Jacob Flier

It is certified that error appears in the above-identified patent and that said Letters Patent are hereby corrected as shown below:

Column 2, line 21 "mixtures" should read -- mixture --;
Column 3, line 6  "portion" should read -- protein --;
Column 5, line 6  "500°F." should read -- 350°F. --;
Column 5, line 49 "0.1 gram" should read -- 0.1 grams --;
Column 6, line 37 "0.1 gram" should read -- 0.1 grams --;
Column 7, line 54 "0.1 gram" should read -- 0.1 grams --;
Column 7, line 57 "ough" should read -- dough --;
Column 9, line 34 "producting" should read -- producing --.

Signed and sealed this 2nd day of April 1974.

(SEAL)
Attest:

EDWARD M. FLETCHER, JR.
Attesting Officer

C. MARSHALL DANN
Commissioner of Patents